Aug. 6, 1940.　　　　　B. HANLY　　　　2,210,077
DRILL BIT
Filed Oct. 12, 1939

Inventor
BENJAMIN HANLY.
By J. Vincent Martin
and
Ralph R. Browning.
Attorneys

Patented Aug. 6, 1940

2,210,077

UNITED STATES PATENT OFFICE 2,210,077

DRILL BIT

Benjamin Hanly, Oklahoma City, Okla., assignor to Reed Roller Bit Company, Houston, Tex., a corporation of Texas Application October 12, 1939, Serial No. 299,055

5 Claims. (Cl. 255—71)

This invention relates to bearings, and more particularly to a general bearing assembly utilized to mount a cone cutter on a spindle of a rotary drill bit.

Numerous mechanical difficulties arise in bearing organizations of this type, due to the fact that the essential bearing parts must all be internal, and protected from injury and contamination by the sand, grit, etc., of the well by the cone cutter, which forms a substantially unbroken protective covering. This is especially true where ball bearings, and a bushing with a ball race, fitted on the spindle, is used. If the balls are inserted into the race through an aperture in the bushing, this aperture must be plugged by a member which will conform to the shape of the raceway and will not rotate on its axis or otherwise change its position, otherwise the free movement of the balls will be hampered. Further, the bushing must be fastened on the spindle by some means such as a nut, wholly within the interior of the cone cutter, which may be tightened and loosened at will, and will not interfere with the rotation of the cutter. I am aware that various forms of cone cutter bearings have been developed, but so far as I am aware, no one has solved the above problems by means similar to those embodied in my invention.

The primary object of my invention is to increase the efficiency of bearings for cone cutters.

Another object is the attainment of smooth and uninterrupted ball race on a cone cutter bearing bushing.

Still another object is a secure and easily attachable and detachable means for holding the bushing on its spindle.

These and other objects may be accomplished by my invention which embodies among its features a bushing having a ball bearing race, a cone cutter fitting thereon and having a corresponding race, an aperture through the bushing leading into the ball race to permit balls to be inserted therein, a plug for said aperture with its upper end shaped to form a part of the race and its lower end provided with a key extending into the bore of the bushing, a spindle onto which the bushing is placed, said spindle having a keyway to receive said key and hold the plug in position and prevent rotation on its axis and thereby maintain a smooth and unbroken ball race, a nut on the end of the shaft to hold the bushing, and a hole through the surface of the cone cutter to permit the entry of a pin to screw or unscrew the nut.

Further objects and features will become evident from the following disclosure when taken in connection with the accompanying drawing, in which—

Figure 1:
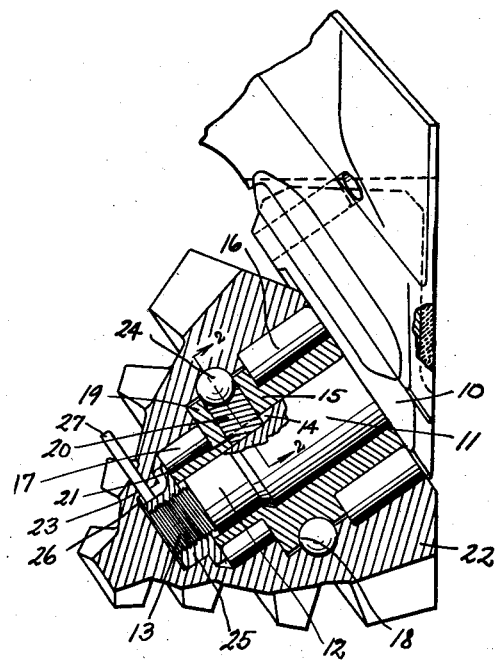
Figure 2:
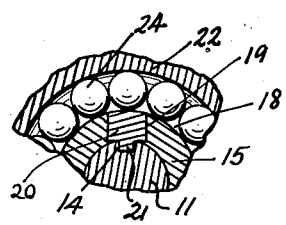

Fig. 1 is a longitudinal cross-section of a cone cutter organization embodying my invention; and Fig. 2 is a fragmentary cross-section, taken on the line 2—2 of Fig. 1.

Referring to the drawing in detail, a drill bit body designated generally at 10 has, made integral therewith, a spindle 11 having a reduced portion 12, a forward screw-threaded portion 13, and a keyway 14 in the larger portion of the spindle, the purpose of which will be hereinafter disclosed.

Securely fitted on the stud shaft 11 is a bushing 15 which has roller bearing races 16 and 17, and a ball race 18. There is a bore 19, of a size to receive ball bearings, drilled through the bushing into the ball race 18, whose purpose is to permit the balls to be inserted into the race. Closure for this bore is effected by the plug 20, whose upper portion, as may be also seen in Fig. 2, is shaped to form a part of the race. In order to prevent the plug from rotating on its axis and thereby spoiling the continuity of the race, and also to prevent rotation of the bushing on the shaft, there is formed on the bottom end of the plug 20 a key 21 which fits in the keyway 14 of the shaft and thereby holds the bushing and the plug against rotation.

Cone cutter 22 is fitted on the bushing, and has roller raceways and a ball race to correspond to the bushing raceways 16, 17, and 18. The cutter has an aperture 23 in its nose for a purpose disclosed below.

In assembling the device, the roller bearings are placed in the races 16 and 17 of the bushing, in heavy grease to hold them in position. The cone cutter 22 is then fitted on the bushing, and ball bearings 24 are inserted through the bore 19 into the ball race 18 following which the plug 20 is inserted in the bore, and the bushing is fitted on the shaft 11 so that the key 21 enters the keyway 14. A nut 25 is shaped to fit in the nose of the cutter 22, normally rotatable therein, the nut having a hole 26 in its side. In order to screw up the nut, a removable pin 27 is inserted through the aperture 23 in the nose of the cutter into the hole 26 in the nut, and the cutter is rotated to rotate the nut. When the nut has been securely tightened, the pin is removed and the cutter is free to rotate.

Accordingly, it will be seen that the nut 25 holds the bushing 15 securely in place, so that the action of the plug 20 with the key and keyway produce a smoothly working ball bearing by which the cone cutter is mounted against axial movement and may be rotated with a minimum of friction. I do not wish to be limited to the specific embodiment set out herein, but only by the scope of the appended claims.

I claim:

1. In a cone cutter bearing, a stud shaft, a bushing on said shaft, a ball bearing race on the bushing, a bore through the bushing leading into said race and of a size to receive ball bearings, a cone cutter mounted on the bushing, said cutter having a ball race corresponding to the race on the bushing, ball bearings in said races, and means for plugging said bore, said means conforming to the shape of said ball race and also coacting with the shaft to hold the means from axial movement and the bushing from rotation with respect to the shaft.

2. In a cone cutter bearing, a stud shaft, a keyway in said shaft, a bushing mounted on the shaft, a ball bearing race on the bushing, a bore through the bushing leading into said race, and of a size to receive ball bearings, a cone cutter mounted on the bushing, a ball race on the inside of the cutter corresponding with the ball race on the bushing, ball bearings therein, and a plug in said bore whose upper end is shaped to form a part of said ball race and whose lower end is formed with a key positioned in said keyway.

3. In a cone cutter bearing, a stud shaft extending from a bit and comprising an enlarged portion adjacent the bit and a reduced portion adjacent the end, a keyway on the enlarged portion, a bushing fitted on the shaft with its outside surface having a ball bearing race, a bore through the bushing of a size to receive ball bearings and leading into said race, a plug through the bore whose upper end forms a part of said race and whose lower end is formed with a key positioned in said keyway, a cone cutter mounted on the bushing, a ball bearing race on the inside of said cutter corresponding with the ball race of the bushing and ball bearings therebetween, and means for holding the bushing on the shaft.

4. In a cone cutter bearing, a shaft, a threaded portion on the free end of the shaft, a bushing fitted on the shaft and of such length that the bushing does not cover the threaded portion, ball bearing and roller bearing races on the outside surface of said bushing, a cone cutter mounted on roller bearings and ball bearings in said races against axial movement with respect to the bushing, a nut separate from the bushing on the threaded portion of the shaft, an aperture in the side of the nut, and a bore in the nose of the cutter positioned to register with the aperture in the nut so that a removable tool may be inserted therein to turn the nut.

5. In a cone cutter bearing, a stud shaft made integral with a bit and comprising an enlarged portion adjacent the bit and a reduced portion adjacent the free end thereof, a threaded portion at the free end thereof, a keyway in the enlarged portion, a bushing fitted on the stud shaft with its outside surface having a large roller bearing race, a smaller roller bearing race, and a ball bearing race therebetween, a bore of a size to receive ball bearings leading through the bushing into the ball bearing race, a plug for the bore whose upper end forms a part of said race and whose lower end is formed with a key positioned in the aforementioned keyway, a cone cutter, races on the inside surface of the cone cutter to correspond with the races on the bushing, said cutter being journaled on the bushing by bearings in the races, a nut on the threaded portion of the shaft, said nut having an aperture in its side, and a hole in the nose of the cone cutter in position to register with the aperture of the nut so that a removable pin may be inserted therein to turn the nut.

BENJAMIN HANLY.